US009747447B2

(12) United States Patent
El-Moussa (10) Patent No.: US 9,747,447 B2
(45) Date of Patent: Aug. 29, 2017

(54) SUSPICIOUS PROGRAM DETECTION (71) Applicant: BRITISH TELECOMMUNICATIONS PLC, London (GB)

(72) Inventor: Fadi El-Moussa, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 62 days.

(21) Appl. No.: 14/779,620

(22) PCT Filed: Mar. 24, 2014

(86) PCT No.: PCT/GB2014/000110
§ 371 (c)(1),
(2) Date: Sep. 24, 2015

(87) PCT Pub. No.: WO2014/155036
PCT Pub. Date: Oct. 2, 2014

(65) Prior Publication Data
US 2016/0055337 A1 Feb. 25, 2016

(30) Foreign Application Priority Data
Mar. 25, 2013 (EP) .................................... 13250033

(51) Int. Cl.
*G06F 21/56* (2013.01)
(52) U.S. Cl.
CPC ...... *G06F 21/566* (2013.01); *G06F 2221/033* (2013.01)
(58) Field of Classification Search
CPC .................. G06F 21/566; G06F 2221/033
See application file for complete search history.

(56) References Cited

U.S. PATENT DOCUMENTS 5,991,774 A * 11/1999 Tate ...................... G06F 11/006
707/697
6,463,583 B1 * 10/2002 Hammond .......... G06F 9/44521
714/E11.207

(Continued)

FOREIGN PATENT DOCUMENTS

EP          2 492 833          8/2012

OTHER PUBLICATIONS

Eric Monti, "Analyzing Malware Hollow Processes", Retrieved From https://www.trustwave.com/Resources/SpiderLabs-Blog/Analyzing-Malware-Hollow-Processes/, Published May 16, 2011.*

(Continued)

*Primary Examiner* — Chau Le
(74) *Attorney, Agent, or Firm* — Nixon & Vanderhye P.C.

(57) ABSTRACT

A processing device (10) includes a processor (12), an interface (14) and a memory (100). The memory (100) is formed from system Random Access Memory (RAM) and one or more other storage devices. The memory (100) can be considered as comprising working memory (110) and persistent storage (120). The working memory includes the system RAM but may also use memory from one or more other storage devices and when certain suspicious program detection modules are operating also stores a comparison table (112) discussed below. Contained within the persistent storage are several executable program files as follows: an Absolute Memory Address Calculator executable program (121) which is responsible for causing the system (10) to inspect a copy of a persistently stored (and compiled) executable program (e.g. an executable program (125, 126, 127, . . . as stored in the persistent storage 120) and to calculate expected absolute memory locations for the various functions or helper programs that it makes calls to and (Continued)

to store these in a table (112) that it creates in the working memory (110) for this purpose; a Loaded Program Accessor executable program (122) which is responsible for causing the system (10) to inspect a copy of an executable program as loaded in the working memory (110) of the system after loading and linking of the program have been completed, to determine the actual memory locations stored in the Import Address Table (IAT) of the loaded program, and to store these actual memory locations in the comparison table (112); a Memory Location Comparator executable program (123) which is responsible for causing the system (10) during execution of this program to compare the calculated expected absolute memory locations with their respective actual accessed memory locations as stored in the comparison table of memory locations (112); and a Corroborator executable program (124) which is responsible for causing the system (10) during execution of this program to perform a corroboration of any mismatches of memory locations detected in the memory location pairs stored in the table (112) of memory locations, by, in the present embodiment, inspecting the contents of any executable instructions contained at the actually accessed memory location to look for the presence of an instruction causing a new thread of execution to be instantiated.

13 Claims, 3 Drawing Sheets

(56) References Cited

U.S. PATENT DOCUMENTS

| | | | |
|---|---|---|---|
| 7,069,594 B1* | 6/2006 | Bolin | G06F 17/30067 707/E17.01 |
| 8,775,877 B2* | 7/2014 | McVey | G06F 11/1004 714/49 |
| 2007/0240222 A1* | 10/2007 | Tuvell | G06F 21/56 726/24 |
| 2008/0127344 A1 | 5/2008 | Sallam | |
| 2011/0041180 A1* | 2/2011 | Jakobsson | G06F 21/56 726/23 |
| 2011/0271343 A1* | 11/2011 | Kim | G06F 21/566 726/23 |
| 2013/0024631 A1* | 1/2013 | Balasubramanian | G06F 21/566 711/154 |
| 2013/0290662 A1* | 10/2013 | Teal | G06F 21/52 711/163 |

OTHER PUBLICATIONS

Aaron Walters, "FATKit: Detecting Malicious Library Injection and Upping the 'Anti'", Retrieved From http://4tphi.net/fatkit/papers/fatkit_dll_rc3.pdf, Published Jul. 30, 2006.*
International Search Report for PCT/GB2014/000110, mailed May 23, 2014, 3 pages.
Written Opinion of the ISA for PCT/GB2014/000110, mailed May 23, 2014, 7 pages.
EP Search Report for EP 13250033.1, dated Sep. 25, 2013, 8 pages.
Ligh et al., "Malware Analyts's Cookbook and DVD", In:"Malware Analyts's Cookbook and DVD", Nov. 3, 2011, pp. 637-671.
Ligh, "Volatility Plug-in for IAT/EAT/Inline Hook Detection" May 23, 2009, whole document, 3 pages.
Levine et al., "Detecting and Categorizing Kernal-Level Rootkits to Aid Future Detection", IEEE, 2006, 9 pages.
Srivastava et al., "Automatic Discovery of Parasitic Malware", School of Computer Science, Georgia Institute of Technology, 2010 (21 pgs.).

* cited by examiner

SUSPICIOUS PROGRAM DETECTION

This application is the U.S. national phase of International Application No. PCT/GB2014/000110 filed 24 Mar. 2014, which designated the U.S. and claims priority to EP Patent Application No. 13250033.1 filed 25 Mar. 2013, the entire contents of each of which are hereby incorporated by reference.

FIELD OF INVENTION

The present invention relates to a method and apparatus for detecting suspicious programs running on a processing device such as a personal computer, server computer, laptop, smart-phone etc.

In general, malware detection can be considered as falling within one or other of two basic types of approach for identifying programs of any sort on a processing device: detecting code (either source or object code—or intermediate code such as java byte code, etc.) using a "signature" of the code or detecting the activity or behaviour of a program. Clearly it is also possible to combine both of these approaches in a single malware detection product as well.

Writers of malicious code (malware) tend to want their code to be difficult to detect (e.g. to avoid being identified and removed by a malware detection product such an anti-virus application). To this end, a malicious program may have its code obscured (e.g. by encrypting a large portion of the code, possibly such that a different form of encryption is used each time a new copy of the malicious program is generated such that the code is "different" (in its encrypted form) for each different copy of the malware—an approach known as polymorphism). This makes the job of typical anti-virus applications more difficult as it becomes harder to identify a suitable "signature" of the malware which is commonly what such anti-virus applications look for when scanning for malware.

Malware also often employs techniques to obscure its behaviour such that anti-malware applications cannot identify them and then close them down in that manner. Malware which employs techniques to hide its behaviour from anti-malware applications are often known as "root kits"—so called because the original "root kits" were a collection of programs (a kit of programs or tools) that provided an (often malicious) user the ability to exercise administrator (root) rights on a system whilst hiding the behaviour of the root kit from other users (e.g. from the genuine administrator of the system).

A common technique employed by root kits and other malicious software generally is to use "hooks" to redirect "calls" (i.e. an instruction for a particular function or piece of executable code to run) from one (usually legitimate) target (such as a function or piece of helping executable code—often contained, in Windows based systems, in a Dynamic Link Library (DLL) executable file) to another target instead (e.g. to a piece of malicious code inserted by a malicious user or some other malware, etc.). Since helper functions or programs such as functions contained within Dynamic Link Library (DLL) files in Microsoft Windows based systems often do not register as separate processes in their own right they can be more difficult to detect for a malware detection program than malicious programs running as their own separately started process. Furthermore, a well-implemented hook may make it seem to the system that a legitimate function from a legitimate DLL file is running rather than the malware program which is actually running.

The present inventor has identified a particular manner in which several current pieces of malware targeting Microsoft Windows based systems in particular are using hooks to cloak their behaviour from anti-malware applications and has developed a corresponding method and apparatus for identifying such behaviour so that appropriate restorative action can be taken by an anti-malware application.

Chapter 17 of "Malware Analyst's Cookbook and DVD" describes a technique for detecting such hooks which is suitable for use by a human analyst. The technique involves looking to see which DLL functions have been used by a program running in memory, and comparing these with DLL functions called by a clean re-build of the program in question. In this way, if the program running in memory has been corrupted by malware and hooks have been inserted into the program, the comparison will indicate differences between the functions called and appropriate action can be taken by the human analyst to fix the situation.

EP 2 492 833 describes an earlier invention of the present inventor in which a program is detected as being potentially a malware program by running it within a secure constrained executable environment and looking for potentially suspicious changes within the executable program (such as, for example, a new executable portion coming into existence (perhaps after having a portion of encrypted data decrypted into a new executable portion)) whilst it is executing within the computer's working memory.

US 2007/0240222 Describes a system and method for providing malware protection on mobile devices. It includes a teaching of a method of identifying possible viruses based on a feature vector, associated with each program to be examined, which identifies the DLL functions used by the associated program. A probability of a program being a virus is calculated based on a set of prior calculated priorities of each DLL function being associated with a virus or non-virus based on training data.

SUMMARY OF INVENTION

According to a first aspect of the present invention, there is provided a method of detecting the possible presence of malware operating on a monitored computer system, the method comprising: accessing a copy of an executable file, the executable file containing the compiled code of a program for execution on the monitored system, as stored on a persistent storage device of the monitored system and calculating in respect thereof estimated absolute values for (preferably virtual) memory locations of functions or helper programs identified for possible calling by the executable program (during execution of the program), which functions or helper programs are intended to be linked (to the program for execution in the monitored system) in a dynamic manner only at load or run time of the program, accessing values of corresponding memory locations contained within the program once loaded into memory, comparing the accessed values with the corresponding calculated estimated values and determining the possible presence of malware on the monitored system where the comparison indicates that at least one pair of an accessed value and a corresponding calculated estimated value do not match.

Having detected the possible presence of malware in this manner, the method effectively concludes that there is a suspicious program present in the system somewhere. Preferred features of the method as set out below can be used to try to identify the actual suspicious program and to isolate it for inspection either by a human (e.g. a user, an administrator or a specialist IT security expert) or by an application such as an anti-virus application etc.

The functions or helper programs (which are intended to be linked in a dynamic manner only at load or run time) are preferably functions or helper programs contained within shared libraries, and most preferably shared libraries which are intended to be linked to in a dynamic manner (e.g. Dynamic Link Libraries (DLL) files in Microsoft Windows systems). Some implementations of a dynamically linked to shared library of functions (including, significantly, current Microsoft Windows implementations) use a table which is contained within the executable program file itself (e.g. as part of a header of that file) to keep track of the address of any such functions which the program may need to call. In current Microsoft Windows implementations, a table called the Import Address Table (IAT) is used for this purpose. One of the last operations of the program linker during loading and linking of a program into the system so it can be executed is to insert the correct address for the respective function into this table. During execution of the program, whenever a call to a particular function is then made by the program, the processor looks up the address of the function from the IAT and jumps execution to that address.

The calculated estimated (or expected) absolute memory location values may be memory locations in a virtual memory space. Preferably, they are calculated by determining the preferred image base value of the program (this is located in the program file itself (e.g. the .exe file) as will be apparent to a person skilled in the art) and adding this to the relative address of the respective function or helper program to be called (this is generally either contained in the program file itself (after suitable compilation by a system appropriate compiler—as is the case with Windows Portable Executable (PE) files such as .exe files and .dll files) or else can be easily determined based on a knowledge of the called function or helper program itself (e.g. knowing the appropriate shared library file in which the function or helper program is located) and the standard operation of the relevant program compiler and/or loader and/or linker etc.).

Preferably, the calculated estimated (or expected) memory location values are calculated only in response to detection of a request (e.g. by a user of the monitored system) to launch the application in question. In this way the process of parsing program files does not need to be performed for all of the executable program files stored on the system, only those that actually get used. However, it is not completely unfeasible to perform a pre-processing step of calculating expected memory location values for all stored executable program files, and then these will not need to be calculated again when a program is actually launched. The simplest way of obtaining a suitable copy of the program is to simply read it from a persistent storage device of the monitored system (e.g. a system or hard drive on which program files are stored). However any method of obtaining such a copy is also feasible (for example, it may be possible to obtain a copy of the program as it appears once loaded into the memory if this is done very early on in the process for loading, and thus before the linking has been done to convert relative addresses into absolute addresses, etc. although since this may be difficult it is generally not a preferred method).

The reason for describing the functions or helper programs as being "identified for possible calling by the executable program" is that depending on the logic of the executable program it may be that such functions or helper programs are in some circumstances never actually called by the program during execution of the program. It may in fact also be the case that because, for example, of some error by the programmer, a particular referenced function or helper program although appearing in the program, is placed in such a way within the program that it cannot in fact, under any circumstances, be called (e.g. because it is only called if a test requires that a variable that is always maintained below 10 exceeds 10, etc.). Generally speaking the program developer must explicitly import any required shared libraries so that the compiler knows to include these at compile-time. A sophisticated compiler may though detect situations such as described above where an imported library or function is not actually used and not bother to include them in the IAT in which case they will not be considered by most embodiments of the present invention; and moreover, if the compiler doesn't do this (i.e. if it does nonetheless include in the IAT details of functions or helper programs that will never actually be called by the program during its execution), it is possible that some embodiments of the present invention could detect such situations and not bother to perform the method in respect of such functions or helper programs (e.g. calculate an estimated memory location for such functions/helper programs, access a corresponding stored memory location in the application as loaded in memory and compare the two memory locations to look for a discrepancy, etc.). However, in general it is easier to include such cases, and a discrepancy here could still indicate the presence of malware even though it is unlikely to give rise to any adverse consequences (at least via this route).

Preferably, accessing values of corresponding memory locations contained within the program once loaded into memory, comparing the accessed values with the corresponding calculated estimated values and determining the possible presence of malware on the monitored system where the comparison indicates that at least one pair of an accessed value and a corresponding calculated estimated value do not match, is performed on more than one occasion, and most preferably is performed several times (either on a periodic basis or simply from time to time according to some other regime) throughout the duration of time that the executable program is running on the system (i.e. while it is loaded in the working memory of the monitored system) in case malicious software corrupts the file header at some point in time after the program has been loaded.

Preferably the method further comprises attempting to corroborate the presence of malware in the monitored system in the event that the comparison indicates a mismatch between the compared values of at least one pair of an accessed memory value and a corresponding calculated estimated memory value in order to provide greater assurance that malware has caused the detected mismatch, and, in the event that the corroboration attempt fails to corroborate the action of malware being associated with the detected mismatch in memory values, determining that the mismatch is not an indication of the presence of malware in the monitored system. Preferably, attempting to corroborate the presence of malware in the monitored system comprises inspecting the memory contents associated with the or each accessed value of the or each memory location contained within the executable program, once loaded into memory, which is assessed as not matching the corresponding calculated estimated value of the or each pair of an accessed memory value and a corresponding calculated estimated memory value, to try to identify executable instructions for causing a new thread of execution to be instantiated, and determining that the detection of malware is corroborated by the successful detection of code for thus instantiating a new thread, but determining that corroboration has failed in the event that no such instructions for causing a new thread to be instantiated are detected by the attempt to corroborate the detected presence of malware in the monitored system.

Detection of code for initiating a new thread provides strong corroboration of the presence of malware because this is a typical action performed by malicious code which is often not performed by a typical function provided by a shared library (which is more often a very quick operation which occurs in line, i.e. as part of the same thread of execution as the part of the main program which called the function or helper program). Moreover, the method preferably further comprises identifying the actual code which the instruction to create a new thread specifies as the code for executing in that new thread. This can be considered as constituting a suspicious program. Preferably the suspicious program thus identified is both logged (i.e. stored in a log saved on the system) and provided to a suitable recipient for further analysis—that further recipient being, for example, an IT security expert and/or an anti-virus application (whether running locally or remotely).

According to a second aspect of the present invention, there is provided a computer system including a malware detection module comprising: an absolute memory address calculator for accessing a copy of an executable program file, the executable program file containing the compiled code of a program for execution on the computer system, as stored on a persistent storage device of the computer system, and for calculating, in respect of the accessed executable program file, estimated absolute values for memory locations of functions or helper programs identified for possible calling by the executable program (during execution of the program), which functions or helper programs are intended to be linked (to the program for execution in the monitored system) in a dynamic manner only at load or run time of the program; a loaded program accessor for accessing values of corresponding memory locations contained within the program once loaded into memory; and a comparator for comparing the accessed values with the corresponding calculated estimated values and determining the possible presence of malware on the monitored system where the comparison indicates that at least one pair of an accessed value and a corresponding calculated estimated value do not match.

As with the first aspect, the calculated and estimated memory locations may be virtual memory locations in modern systems using virtual memory.

Preferably, the computer system further comprises a malware detection corroborator module for attempting to corroborate the presence of malware in the monitored system in the event that the comparator detects a mismatch between the compared values of at least one pair of an accessed memory value and a corresponding calculated estimated memory value in order to provide greater assurance that malware has caused the detected mismatch whereby, in the event that the corroborator fails to corroborate the action of malware being associated with the detected mismatch in memory values, the system determines that the mismatch is not an indication of the presence of malware in the computer system. Preferably, the malware detection corroborator module comprises a memory contents inspector for inspecting the memory contents associated with the or each accessed value of the or each memory location contained within the executable program, once loaded into memory, which is assessed as not matching the corresponding calculated estimated value of the or each pair of an accessed memory value and a corresponding calculated estimated memory value, and trying to identify executable instructions for causing a new thread of execution to be instantiated, and for determining that the detection of malware is corroborated by the successful detection of code for thus instantiating a new thread, but determining that corroboration has failed in the event that no such instructions for causing a new thread to be instantiated are detected by the memory contents inspector.

In some embodiments, the system may use operating system virtualisation techniques to provide a sandbox effect. In other words, rather than having the operating system (e.g. Microsoft Windows) directly interact with hardware elements of the monitored system, it could instead interact with virtualised hardware elements provided by a hypervisor layer. In such a case, it may be possible for various of the malware detection modules to be based at or beneath the hypervisor layer rather than in the monitored operating system itself. This would provide many significant advantages over alternative embodiments where the malware detection modules are all running in the operating system being monitored. For example, if there is a suspicion of possible malware being present, then the computer can be run in a safe mode where no real external connections to an external network are permitted. Additionally, if some malware is detected it is generally trivial to load a new instance of an OS image which could be a backed up image taken from a time before the malware infected the system, etc.

Further aspects of the present invention relate to processor implementable instructions for carrying out the method of the first aspect of the present invention and to a carrier medium, most preferably a non-transient carrier medium such as an optical or magnetic storage disk or a solid state memory device, carrying processor implementable instructions for carrying out a method according to the first aspect of the present invention.

BRIEF DESCRIPTION OF THE DRAWINGS

In order that the present invention may be better understood, embodiments thereof will now be described, by way of example only, with reference to the accompanying drawings in which.

DETAILED DESCRIPTION OF EMBODIMENTS

Figure 1:
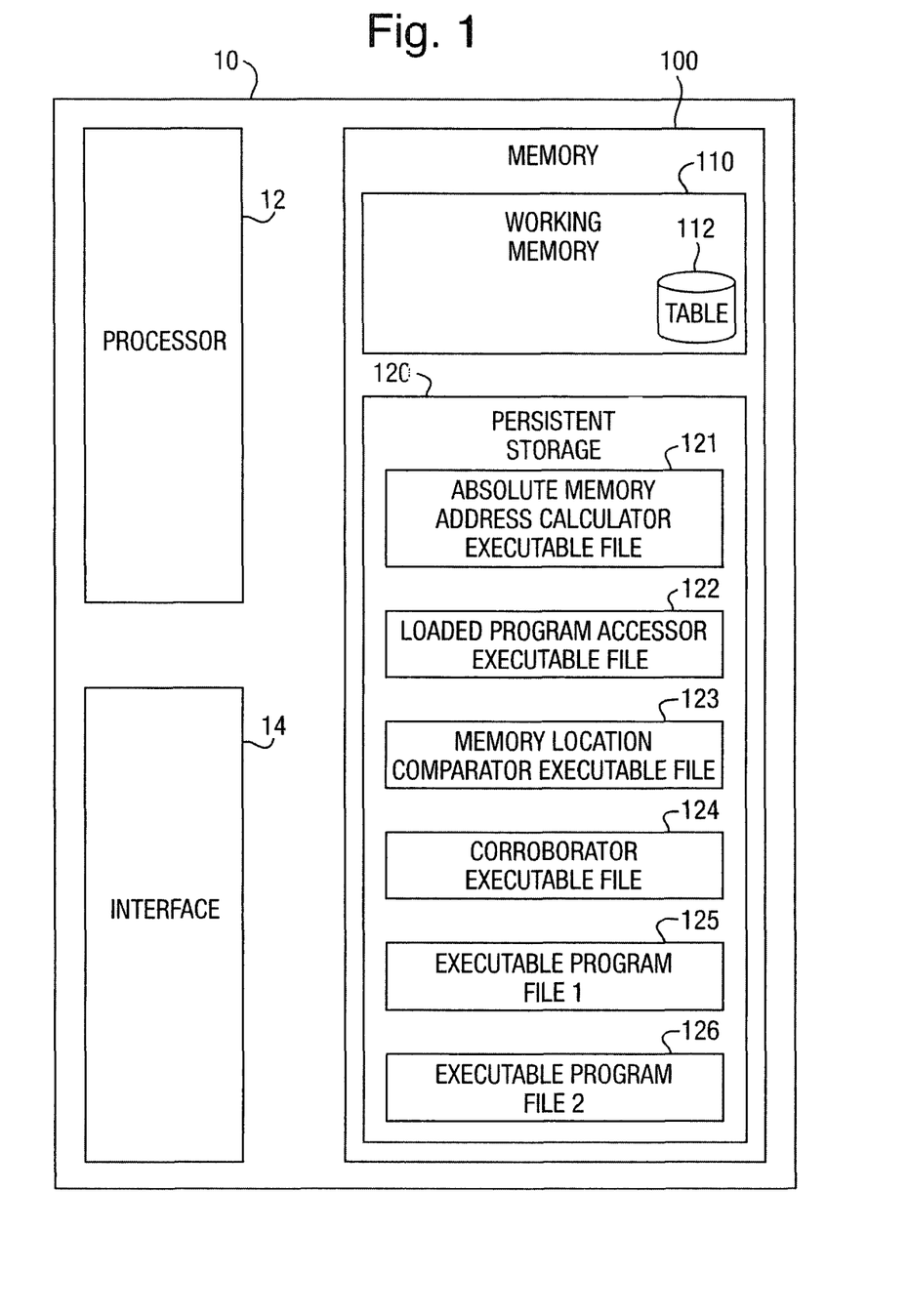
FIG. 1 is a schematic block diagram of a computer system according to an embodiment of the present invention.

FIG. 1 gives a schematic overview of a computer system in accordance with a preferred embodiment of the present invention. As shown, the computer system 10 is illustrated as comprising a processor 12, an interface 14 and a memory 100. The memory 100 is illustrated as comprising a working memory 110 and a persistent storage area 120. As is discussed in greater detail below, several programs are stored in the persistent storage area 120. In order to be executed by the system, a program needs to be loaded into the working memory 110. The working memory includes the actual system Random Access Memory (RAM) but may also include other memory devices (e.g. a hard drive or even a USB flash drive, etc.) because of the use of techniques such as virtual memory which are well known to persons skilled in the art and so will not be elaborated upon in great detail here, except to mention that with many common virtual memory implementations (including those of most modern Microsoft Windows implementations) each application is given the illusion of having its own memory space to work in, whilst the actual portion of memory in which various parts of the application and functions which it calls from time to time are stored in real memory locations which are unknown to it and controlled by another device (e.g. a Memory Management Unit (MMU) which often forms a part of the Central Processing Unit die in practical modern implementations but may nonetheless be thought of as being distinct from the processor 12 of schematic FIG. 1). What this means is that executable programs get installed into a base virtual memory location which they can specify (or which the compiled program can specify—e.g. in its header portion) without worrying about the possibility of the selected memory location conflicting with other executable programs which have been previously loaded (because each executable program is assigned its own virtual memory space). This makes the job of the loader rather straightforward—it just loads the program into its own virtual memory at the preferred location. Moreover, the MMU can control that shared functions can be allocated a memory location within the virtual memory space associated with the executable program wishing to use such functions, without the functions actually having to be loaded into actual memory space associated with the calling program, this means that a single copy of the shared function can be installed into actual physical memory with many different programs calling it (and using different virtual memory locations each associated with the respective calling program) and the MMU ensures that the calls are correctly mapped to the correct part of real memory space where the function actually resides.

The working memory 110 is additionally illustrated as containing a table 112. This table 112 stores memory locations as discussed in greater detail below and is specific to the operation of the absolute memory address calculator and the loaded program accessor modules which are described in greater detail below.

As mentioned above, the persistent storage area 120 contains a number of executable programs as follows:

an Absolute Memory Address Calculator executable program 121 which, as discussed in greater detail below, is responsible for causing the system 10 to inspect a copy of a persistently stored (and compiled) executable program (e.g. an executable program 125, 126, 127, . . . as stored in the persistent storage 120) and to calculate expected absolute memory locations for the various functions or helper programs that it makes calls to (or might possibly make calls to during its execution) and to store these in a table 112 that it creates in the working memory 110 for this purpose.

a Loaded Program Accessor executable program 122 which, as discussed in greater detail below, is responsible for causing the system 10 to inspect a copy of an executable program as loaded in the working memory 110 of the system after loading and linking of the program have been completed, to determine the actual memory locations stored in the IAT of the loaded program, and to store these actual memory locations in the table 112.

a Memory Location Comparator executable program 123 which, as discussed in greater detail below, is responsible for causing the system 10 during execution of this program to compare the calculated expected absolute memory locations with their respective actual accessed memory locations as stored in the table of memory locations 112.

a Corroborator executable program 124 which, as discussed in greater detail below, is responsible for causing the system 10 during execution of this program to perform a corroboration of any mismatches of memory locations detected in the memory location pairs stored in the table 112 of memory locations, by, in the present embodiment, inspecting the contents of any executable instructions contained at the actually accessed memory location to look for the presence of an instruction causing a new thread of execution to be instantiated.

Finally, several other executable program files including executable program files 1 (125), 2 (126) and 3 (127) which could, for example by a web browser, a word processor application, a spreadsheet application, etc.

Figure 2:
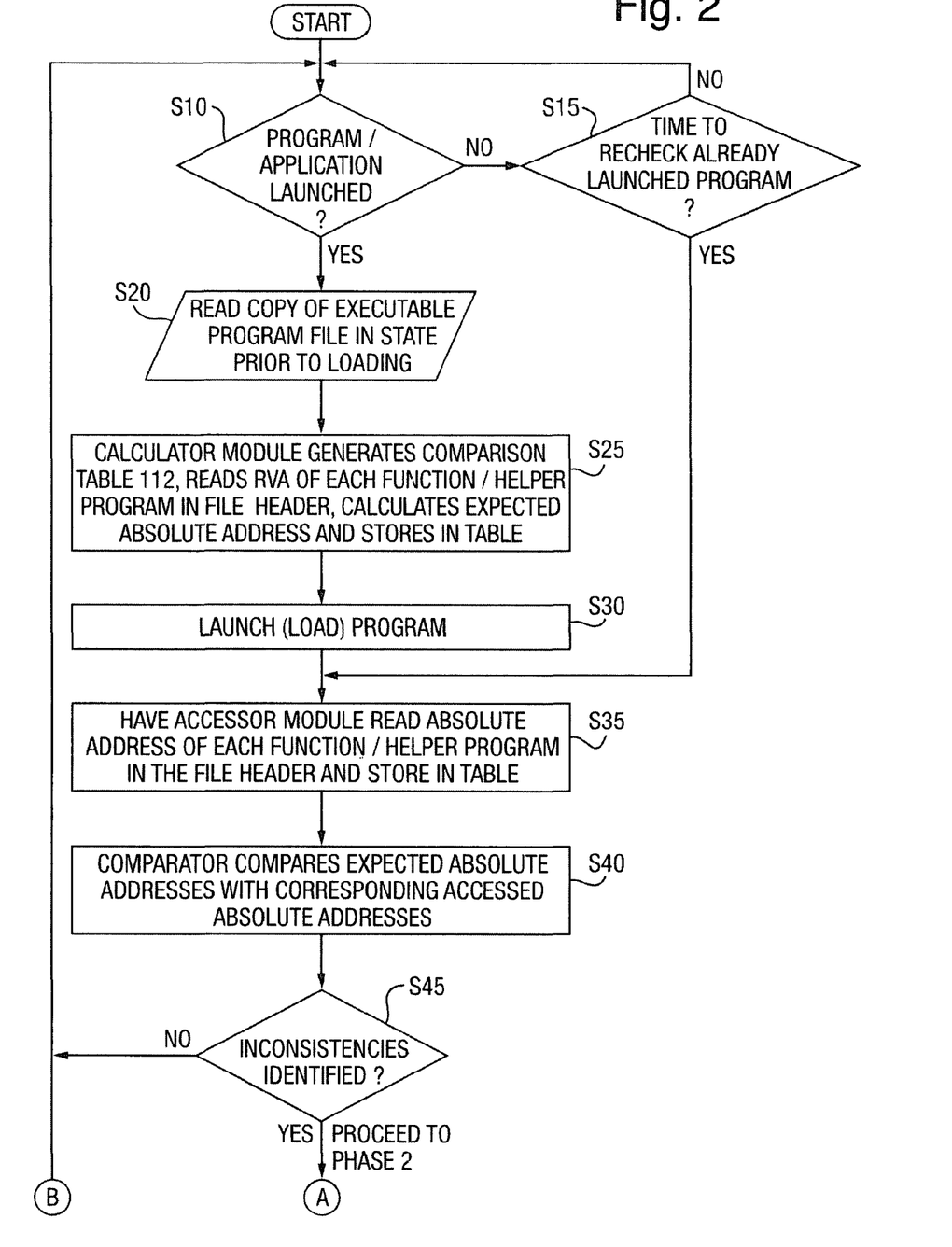
FIG. 2 is a schematic flow chart of a first part of a method performed by the computer system of FIG. 1 in order to detect the presence of possible malware.
Figure 3:
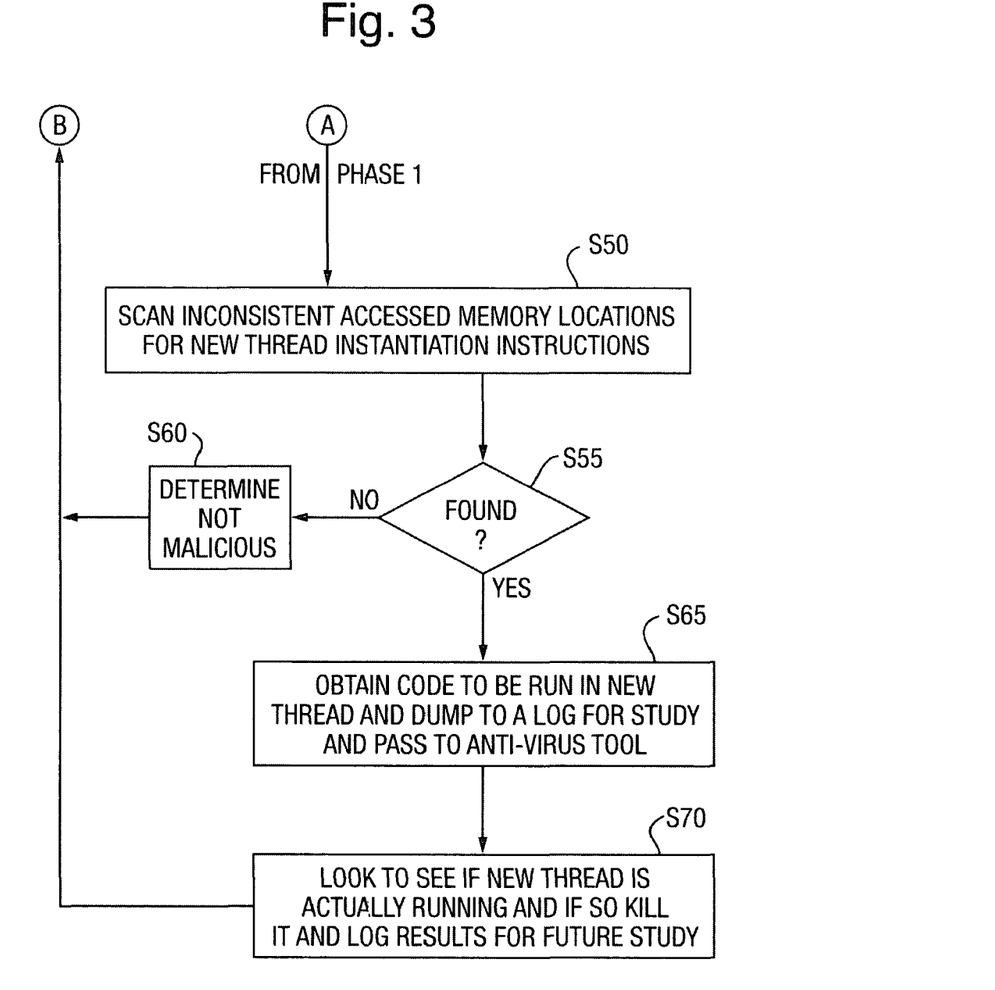
FIG. 3 is a schematic flow chart of a second part of the method performed by the computer system of FIG. 1 in order to detect the presence of possible malware, the second part of the method attempting to corroborate evidence of malware identified by the first part.

Before discussing the operation of the system of FIG. 1 in greater detail and with reference to the flow charts of FIGS. 2 and 3, a brief further discussion is given here of the techniques employed by the type of malware that system 10 is specifically attempting to detect in order to better understand the operation of system 10. One technique that malware, that system 10 is attempting to detect—such as a rootkit, can use to hide its malicious activity (such as opening network port's to enable remote malicious devices to further infect the system by downloading additional malware to the system, or via which confidential data from the system 10 can be sent to remote devices over the network, etc.) is to run the malicious code inside a legitimate application memory space address. This type of rootkit technique involves modifying the memory space of the legitimate application and injecting the malicious code there. This technique can evade detection by a conventional anti-virus software application because the anti-virus software application is not aware that there is another (malicious) application running in the same memory space of the legitimate application (program) and any network connections, open ports, etc. actually initiated by the malware will appear to the anti-virus application as if they had been initiated by the legitimate application rather than by the malware. Furthermore, by using this technique, the actual malware application will not be detectable by normal system tools (e.g. a Task Manager in Microsoft Windows implementations) as a new application running because it is "running under the hood of" the legitimate application, thus hiding the running of the malicious application.

Most Microsoft Windows applications use the Windows Application Programming Interface (API) to interact with the operating system (or with other programs). The Windows API is a name that collectively refers to the procedures and functions that comprise the Windows Operating System (and importantly the means to access them). The procedures and functions are shipped with Windows in libraries, called Dynamic Link Libraries, otherwise known as DLL's. For instance, when a program displays a message box to the user, it is basically call a procedure in one of the Windows DLL's to display the message box. Similarly, when a program tries to download a file or run a program it calls one of the functions accessible via the API to perform the operation. So the Windows API can be thought of as providing all of the basic functionalities required to develop a program.

Therefore, a developer does not need to write the codes for basic functionalities from scratch. One of the reasons for the popularity of the Microsoft Windows operating system among developers is its professionally documented and diverse Windows API. An application developer can simply call the appropriate functions in the Windows API to create rich and interactive environments such as graphical user interfaces.

Due to their widespread usage, the functionality of all Windows applications depends on the Windows API. Therefore, a Windows application can be conceptually mapped to a stream of Windows API calls. By observing API calls it is possible to determine to a large extent the functionality of the application.

Normally, when an application uses a function in the Windows API (e.g. within the WIN32 API which is the API associated with 32 bit based Windows operating systems), the application must import the address of the function from the corresponding DLL file in which the application resides. Each DLL that the application uses is contained in the file header structure. The file header structure contains the name of the DLL whose functions are imported by the application, and a pointer that points to the name of the imported function.

So normally, when a program/application is loaded by the Operating System (OS) the executable program file and all the relevant DLLs are uploaded into the same (virtual) memory space. Then the OS (via the linker of the OS in particular) automatically links all of the relevant DLLs to the program. The automatic linking process involves reading each DLL name and each function name from the file header structure (of the program being loaded) and allocating them into the memory. In particular, the OS linker reads the "AddressOfFunction" header field in the program file which contains the Relative Virtual Address (RVA) that points into the address space of a process once it has been loaded. Once the program is loaded, the relative virtual address should be added to the module base address to get the exact location in the (local, virtual) address space (the absolute rather than relative address in the virtual memory space) of the process. So the OS linker calculates the exact location of each function in each DLL that the program being loaded (might) require and adds them to the AddressofFunction field in the file header using the formula:

The exact location in memory=RVA+Image Base Address

The RVAs themselves are generated at build time for the executable (i.e. when the program file is compiled to generate an executable program file), but they do not reflect the actual address of the function in memory. The actual address is calculated "on the fly" once the file and (probably notionally only with modern operating systems) the corresponding DLL is loaded into memory using the previous formula and the address of each function will be uploaded to the AddresOfFunction field in the field header structure. So when the operating system loads the application/file in memory, it reads the AddressOfFunction section and parses the IMAGE_IMPORT_DESCRIPTOR structures and loads each required DLL into the application's memory. Once the DLL is mapped, the operating system then locates each imported function in memory and overwrites one of the IMAGE_IMPORT_BY_NAME arrays with the actual address of the function.

So during the execution of the program/application, if the application tries to call (run) a function then it will extract the memory address of that function from the IMAGE_IMPORT_BY_NAME array and run the function from the imported DLL. A malware author can exploit that process and inject their malicious code by modifying the function address to point to the malicious code instead of the function of the imported DLL. This technique is used by rootkits to hide some of their functionality and to effectively inject the malicious code into the private virtual memory of the legitimate application's private virtual memory space.

In simple terms, the rootkit parses the file header of the legitimate program once it is loaded into the working memory of the system and replaces the target function's address in the file header with the address of the malicious code. Then, when the function is called by the legitimate application, the malicious code will be executed instead of the original function at the imported DLL.

So for example, if a legitimate program should call a function X in a DLL Y, then the file header structure points to library DLL Y and the relative virtual address (RVA) of the function X (for example 0xABCDEF1). Then the rootkit could basically overwrite the function X address (0xABCDEF1) in the file header with a memory address that points to the malicious code or function (for example 0xABCEE2). In this way, the function X is now pointing to different memory location where the malicious code resides. So when the legitimate application tries to invoke function X it will in fact run the malicious code.

Usually, the malicious code, in order to make sure the malicious code can run in the background without greatly affecting the running of the legitimate application, then instantiates a new thread in which the malicious functionality is performed. Often the malicious code in the existing thread of execution will then jump control to the actual function or helper program that the legitimate application actually tried to call.

Turning now to the actual method employed by the system 10 in order to detect the above described type of behaviour, in the present (Microsoft Windows based implementation) the approach adopted is to observe and monitor the file execution behaviour of normal (legitimate) executable programs. There are two phases in the present embodiment contributing to the overall detection: a first phase (whose method is illustrated in FIG. 2) of trying to detect file header inconsistencies between the compiled (but not loaded) executable program file, and the corresponding program file once it has been loaded into the working memory 110 of the system. The second phase is to corroborate any inconsistencies detected by the first phase, in the present embodiment by looking for malicious code seeking to instantiate a new thread of execution in which malicious functions can be carried out.

First Phase

Turning now to FIG. 2, after commencement of the first phase at step S05, the process proceeds to step S10 in which it is determined whether or not a program/application is to be launched. If no program is detected as being launched the process proceeds to step S15 in which it is determined if it is time to recheck an already previously launched program (e.g. based on a timeout period set after completing a previous check (or recheck) of a launched program such that rechecking of a launched program is performed periodically on all launched programs until they are closed down and thus unloaded from the working memory). If the determination at step S15 is positive then the process jumps to step S35 described below, otherwise the process loops back to step S10 until either a (new) program is launched or an already launched program is due to be rechecked.

If a positive determination is made at step S10, then the method proceeds to step S20 in which a copy of the executable program file of the program/application to be launched is obtained (in a form prior to it having been loaded—in this embodiment by simply reading it from the persistent storage 120—e.g. from a program directory of the system 10's file system).

The process then proceeds to step S25 in which the calculator module (which is implemented in the present embodiment by running the Absolute memory address calculator executable program 121) generates a comparison table 112 for the newly to be launched program/application, reads the Relative Virtual Address (RVA) of each function/helper program in the file header of the executable program file of the newly to be launched program/application, calculates a an expected absolute address for each such RVA and stores the calculated expected value in the created table 112. A schematic illustration of the table used in the present embodiment is set out below in Table 1.

TABLE 1

| Dll Name | Imported Function name | Function RVA in the file header | Calculated Expected Function absolute address | Function Actual Address in Memory |
| --- | --- | --- | --- | --- |
| kernel32.dll | FindFirstFile | 0xABCDEFG1 | 0xAEEFCA1C3F | 0xAEEFCA1C3F |
| kernel32.dll | FindNextFile | 0xABCDEFG2 | 0xBCBA1FCE2A | 0xBCBA1FCCCC |

In the present embodiment, the calculator module uses two well-known publicly available tools for accessing the information, namely one called LordPE and one called API Monitor, however, it will of course be apparent to a person skilled in the art that any appropriate tool can be used and that the above tools are merely suitable for Microsoft Windows environments and alternative methods should be employed to apply this invention to alternative operating system environments. In the present embodiment, the API Monitor tool is used in a first parse of the file being read in order to identify all of the called functions and then the LordPE tool is used to extract the RVA for each identified function. The calculation required to find the calculated expected function absolute address is:

Calculated expected function absolute address=preferred image base address+RVA

Note that the preferred image base address is determined at build-time (also known as compile-time) by the compiler based on the target operating system and is also stored in the PE file header (in Windows environments—other operating systems operate in a similar manner though specific details may change). In the present embodiment, the preferred image base address is determined using the LordPE tool just once and then used in all subsequent calculations (of expected absolute addresses).

Upon the completion of step S25, the first 4 columns of the table 112 have been filled and the process then moves to step S30 in which the program is launched (i.e. loaded into the working memory for execution by the system). In the present embodiment, this is done via a debugging tool, specifically the well-known OllyDbg tool (currently available at the following URL http World Wide Website ollydbg.de). Using a debugging tool is convenient for the purposes of the present invention because it enables the header to be parsed easily and can also help with debugging any interesting problems with the program which may occur. However, there is a slight performance penalty with such a system and so it may not be so ideal for embodiments where the malware detection is intended to operate continuously during normal operation of the system rather than just at specific times when specifically looking for a malware problem, Furthermore, alternative approaches could be used in other embodiments such as using a kind of sandbox approach or running the operating system entirely within a virtualized machine via a hypervisor etc.

In any event, once the program has been launched at Step S30, the process proceeds to step S35 in which the Accessor Module (which is implemented in the present embodiment by running the Loaded Program Accessor executable program 122) reads the absolute (local, virtual) address value of each function specified in the table 112 and adds it as an entry (in the appropriate row as determined by the respective function) in the fifth column. In the present embodiment, this information is extracted from the header of the executable file as loaded into the working memory 110 of the system 10 using the debugger program. Note that if this step is being performed in respect of a program that was launched sometime ago and is now being rechecked (i.e. where this step has been reached directly from previous step S15 as a result of a determination that it is time to recheck the previously launched program) then the values already present in the fifth column of the table are simply overwritten with the new values.

Having completed step S35, the process proceeds to step S40 in which the Comparator module (which is implemented in the present embodiment by running the Memory Location Comparator executable program file 123) compares each pair of entries in the fourth and fifth columns of the table 112 (i.e. in each row) to look for a mismatch or inconsistency. For example, considering Table 1 above it can be seen that in the first row (associated with function FindFirstFile) the entries in the fourth and fifth columns match, whereas in the second row (associated with the function FindNextFile) the entries in the fourth and fifth columns do not match (forming an inconsistent or mismatching pair of memory values)—specifically the expected absolute address 0xBCBA1 FCE2A does not match the actual address found in the header of the PEfile loaded into working memory of 0xBCBA1FCCC.

Upon completion of step S40, the process proceeds to step S45 in which it is determined whether or not any inconsistencies were identified in step S40 above; if not, then no indication of the presence of malware has been detected on this occasion and the process loops back to the start to await either the requested launch of a new program (at step S10), or a trigger (at step S15) for a new check to be made on an already launched and running program. If, however, one or more inconsistencies have been identified in step S40, then the process proceeds to the commencement of phase 2 at step S50 of FIG. 3 described below.

Turning now to FIG. 3, when the first phase identifies some inconsistencies between the expected absolute (virtual local) memory addresses of imported functions or helper programs, and the corresponding respective actual such addresses contained in the IAT of the monitored program's file header, then the process proceeds to phase two in which an attempt is made to corroborate such an indication of the operation of a possibly malicious program.

Thus, at the commencement of phase 2 at step S50 the corroborator module (which is implemented in the present embodiment by running the Corroborator executable program file 124) scans the inconsistent memory address (the actual address found in the IAT of the loaded program—i.e. the value contained in the fifth column in Table 1 in the present embodiment) and parses the contents of that memory location. In the present embodiment, this is done using the debugger. Furthermore, as mentioned above, in the present embodiment, the corroborator looks for code at this memory address which instantiates a new thread of execution, in particular, in the present embodiment, by looking for the presence of a CreateRemoteThread( ) function call.

Upon completion of step S50, the process proceeds to step S55 in which it is determined, in the present embodiment, whether or not a new thread instantiation instruction was identified or not. If no such instruction was identified then, in the present embodiment, the process proceeds to step S60 in which the system concludes that there is no indication of malware present and the process loops back to the start to await either the requested launch of a new program (at step S10), or a trigger (at step S15) for a new check to be made on an already launched and running program. If, however, it is determined at step S55 that such an instruction to instantiate a new thread has been detected, then the process proceeds to step S65.

In step S65, the corroborator module tries to identify and extract the code to be run in the new thread. The exact way in which this is done varies from case to case but in general the instruction to instantiate the new thread will give an indication of what code is to be executed within the thread by a suitable reference or by simply locally including the code to be run. If the code is present within the new thread creation instruction it is simply extracted. If a reference is made (e.g. to another function or helper program) then that reference is followed and the referred to function or helper program is obtained (e.g. if it is referenced by name then the local memory is searched for a function or program of that name, if a memory location is specified then the contents of the memory at that location are obtained, etc.). Having obtained the code which is to be run within the new thread, this is then logged into a log file for later study by a human user or administrator and it is passed to an anti-virus application for checking. Note that the code as loaded in the memory will likely be in a fairly clear (i.e. not encrypted or obscured form) since it generally needs to be directly executable by the system if it is to work, thus making the job of the anti-virus application much easier.

Upon completion of step S65, the process then proceeds in the present embodiment to step S70 in which the corroborator module looks to see if the new thread identified in step S50 has actually been initiated. This can be done using an appropriate system tool provided by the operating system such as the NtQueryInformationProcess function provided in modern Microsoft Windows operating systems etc. In the present embodiment, if such a process is found to be running it is killed (again using standard operating system tools for doing this) and the results of this step (i.e. whether or not a running process was identified associated with the new thread, if one was details of the process, and whether or not the attempt to kill it was successful). Final step S70 is really an optional step and can be dispensed with in alternative embodiments.

Upon completion of phase 2 (e.g. after completing step S70 if it is present, or after completing step S65 if step S70 is omitted) the process then loops back to the start to await either the requested launch of a new program (at step S10), or a trigger (at step S15) for a new check to be made on an already launched and running program.

The invention claimed is:

1. A method of detecting the possible presence of malware operating on a monitored computer system, the method comprising:
accessing a copy of an executable program file, the executable program file containing the compiled code of a program for execution on the monitored system, as stored on a persistent storage device of the monitored system and calculating in respect thereof expected absolute values for memory locations of functions or helper programs identified for possible calling by the executable program file, which functions or helper programs are intended to be linked in a dynamic manner only at load or run time of the program,
accessing values of corresponding memory locations contained within the executable program file once loaded into memory, and
comparing the accessed values with the corresponding calculated expected values and determining the possible presence of malware on the monitored system where the comparison indicates that at least one pair of an accessed value and a corresponding calculated expected value do not match.

2. The method according to claim 1 wherein the method is carried out in respect of the executable program file in response to a request being placed with the operating system of the monitored system for the executable program file to be launched.

3. The method according to claim 1 further comprising attempting to corroborate the presence of malware in the monitored system in the event that the comparison of corresponding expected and actual memory locations indicates a mismatch between the compared values of at least one pair of an accessed memory value and a corresponding calculated expected memory value in order to provide greater assurance that malware has caused the detected mismatch, and, in the event that the corroboration attempt fails to corroborate the action of malware being associated with the detected mismatch in memory values, determining that the mismatch is not an indication of the presence of malware in the monitored system.

4. The method according to claim 3 wherein attempting to corroborate the presence of malware in the monitored system comprises inspecting the memory contents associated with the or each accessed value of the or each memory location contained within the executable program file, once loaded into memory, which is assessed as not matching the corresponding calculated expected memory location value, to try to identify executable instructions for causing a new thread of execution to be instantiated, and determining that the detection of malware is corroborated by the successful detection of code for thus instantiating a new thread, but determining that corroboration has failed in the event that no such instructions for causing a new thread to be instantiated are detected by the attempt to corroborate the detected presence of malware in the monitored system.

5. A non-transitory, computer-readable storage medium storing instructions for causing a processing device to carry out the method of claim 1 during execution of the instructions by the processing device.

6. A computer system including a malware detection module, the malware detection module comprising:
an absolute memory address calculator for accessing a copy of an executable program file, the executable program file containing the compiled code of a program for execution on the computer system, as stored on a persistent storage device of the computer system, and for calculating, in respect of the accessed executable program file, expected absolute values for memory locations of functions or helper programs identified for possible calling by the executable program file, which functions or helper programs are intended to be linked in a dynamic manner only at load or run time of the program;

a loaded program accessor for accessing values of corresponding memory locations contained within the executable program file once loaded into memory; and a comparator for comparing the accessed values with the corresponding calculated expected values and determining the possible presence of malware on the monitored system where the comparison indicates that at least one pair of an accessed value and a corresponding calculated expected value do not match.

7. The computer system according to claim 6 further comprising a corroborator module for attempting to corroborate the presence of malware in the monitored system in the event that the comparison of corresponding expected and actual memory locations indicates a mismatch between the compared values of at least one pair of an accessed memory value and a corresponding calculated expected memory value in order to provide greater assurance that malware has caused the detected mismatch, and being further operable to, in the event that the corroboration attempt fails to corroborate the action of malware being associated with the detected mismatch in memory values, determine that the mismatch is not an indication of the presence of malware in the monitored system.

8. The computer system according to claim 7 wherein the corroborator module comprises a memory contents parser for inspecting the memory contents associated with the or each accessed value of the or each memory location contained within the executable program file, once loaded into memory, which is assessed as not matching the corresponding calculated expected memory location value, to try to identify executable instructions for causing a new thread of execution to be instantiated, and wherein the corroborator module is operable to determine that the detection of malware is corroborated by the successful detection of code for thus instantiating a new thread, but is operable to determine that corroboration has failed in the event that no such instructions for causing a new thread to be instantiated are detected by the attempt to corroborate the detected presence of malware in the monitored system.

9. The computer system of claim 6, further comprising non-transitory, computer-readable storage medium storing instructions executable by the computer system to implement the absolute memory address calculator, the loaded program accessor, and the comparator.

10. A system comprising:
   a computer processing system, including a computer processor, the computer processing system being at least configured to:
      access a copy of an executable program file, the executable program file containing the compiled code of a program for execution on the computer processing system, as stored on a persistent storage device of the system,
      calculate, in respect of the accessed executable program file, expected absolute values for memory locations of functions or helper programs identified for possible calling by the executable program file, which functions or helper programs are intended to be linked in a dynamic manner only at load or run time of the program;
      access values of corresponding memory locations contained within the executable program file once loaded into memory; and
      compare the accessed values with the corresponding calculated expected values and determine the possible presence of malware on a monitored system where the comparison indicates that at least one pair of an accessed value and a corresponding calculated expected value do not match.

11. The system of claim 10, further comprising non-transitory, computer-readable storage medium storing instructions executable by the processing system to: access the copy of the executable program file, calculate the expected absolute values, access the values of the corresponding memory locations, compare the accessed values with the corresponding calculated expected values, and determine the possible presence of the malware.

12. The system according to claim 10, wherein the computer processing system is further configured to:
   attempt to corroborate the presence of malware in the monitored system in the event that the comparison of corresponding expected and actual memory locations indicates a mismatch between the compared values of at least one pair of an accessed memory value and a corresponding calculated expected memory value in order to provide greater assurance that malware has caused the detected mismatch, and
   in the event that the corroboration attempt fails to corroborate the action of malware being associated with the detected mismatch in memory values, determine that the mismatch is not an indication of the presence of malware in the monitored system.

13. The system according to claim 12, wherein the computer processing system is further configured to:
   inspect the memory contents associated with the or each accessed value of the or each memory location contained within the executable program file, once loaded into memory, which is assessed as not matching the corresponding calculated expected memory location value, to try to identify executable instructions for causing a new thread of execution to be instantiated,
   determine that the detection of malware is corroborated by the successful detection of code for thus instantiating a new thread, and
   determine that corroboration has failed in the event that no such instructions for causing a new thread to be instantiated are detected by the attempt to corroborate the detected presence of malware in the monitored system.

* * * * *